(12) United States Patent  (10) Patent No.: US 8,613,578 B2
Hutchinson  (45) Date of Patent: Dec. 24, 2013

(54) HIDDEN TIE DOWN

(76) Inventor: Ronald M. Hutchinson, Brookfield, WI (US)

( * ) Notice: Subject to any disclaimer, the term of this patent is extended or adjusted under 35 U.S.C. 154(b) by 132 days.

(21) Appl. No.: 13/420,370

(22) Filed: Mar. 14, 2012

(65) Prior Publication Data

US 2013/0067696 A1  Mar. 21, 2013

Related U.S. Application Data

(60) Provisional application No. 61/452,279, filed on Mar. 14, 2011.

(51) Int. Cl.
*B60P 7/08* (2006.01)
(52) U.S. Cl.
USPC ............ 410/107; 410/106; 410/111; 410/112
(58) Field of Classification Search
USPC ......... 410/106, 107, 109, 110, 111, 112, 113, 410/114, 116; 24/115 K; 265 CD; 248/499
See application file for complete search history.

(56) References Cited

U.S. PATENT DOCUMENTS

| | | |
|---|---|---|
| 3,298,652 A | 1/1967 | Burdick |
| 3,860,209 A | 1/1975 | Strecker |
| 3,893,399 A | 7/1975 | Lewis et al. |
| 3,907,184 A | 9/1975 | Zane et al. |
| 4,151,974 A | 5/1979 | Kuhn |
| 4,457,650 A | 7/1984 | Tseng |
| 5,115,954 A | 5/1992 | Bott |
| 5,265,992 A * | 11/1993 | Jensen .......................... 410/116 |
| 6,138,975 A | 10/2000 | McDaid |
| 6,918,721 B2 | 7/2005 | Venton-Walters et al. |
| 7,134,819 B2 | 11/2006 | Bullock et al. |
| 7,201,550 B2 | 4/2007 | Borrmann et al. |
| 7,252,171 B2 | 8/2007 | Augustine, Jr. |
| 7,431,548 B2 | 10/2008 | Acton et al. |
| 2001/0031187 A1 | 10/2001 | Goham et al. |

* cited by examiner

*Primary Examiner* — Stephen Gordon
(74) *Attorney, Agent, or Firm* — Joseph S. Heino; Patrick M. Bergin

(57) ABSTRACT

A hidden tie down provides a round collar that is inserted into a like-sized round aperture formed in a planar surface. A cap and cap mount are attachable to the collar at the outer face of the surface. A fastener secures the collar to the surface at the inner face of the surface. Two opposing bushings are disposed within the collar to retain each end of a hook loop within them. The hook loop includes a round lid that closes off a like-sized round opening in the cap such that, in one position, the lid closes off the cap opening and creates a substantially flush surface across the cap. In another position, the hook loop extends outwardly from the cap opening to provide an attachment structure. Each bushing includes a detent to retain the hook loop in a stowed position.

16 Claims, 7 Drawing Sheets

HIDDEN TIE DOWN

This application claims the benefit and priority of U.S. Provisional Patent Application No. 61/452,279 filed Mar. 14, 2011.

FIELD OF THE INVENTION

The present invention relates generally to devices and fasteners used to secure a first item to a second item, the second item being mobile or stationary. More specifically, the present invention relates to a tie down that can be mounted into one or more surfaces of such a second item for the purpose of attaching a first item or items to the second item using a rope, strap, elastic cord or other tying means.

BACKGROUND OF THE INVENTION

Various surface-mountable devices are known in the art. They include tie down rings, loops and fingers, among other structures. Sometimes, such structures are permanently configured to extend outwardly from the surface that they are mounted to. This can affect the functionality and the aesthetics of the mounting surface. Other times, such structures provide the ring, loop or finger to be movable to a position that is flush with the mounting surface. While this may improve functionality, it does not necessarily improve the aesthetics of the mounting surface. In the view of this inventor, there is a need to provide a hidden tie down structure that provides the tie down structure that is necessary to secure an item to a surface and alternatively hides or conceals the tie down structure when such is desired or required. There is also a need to provide such a structure that is easy to use and aesthetically pleasing when the tie down structure is stowed away.

Accordingly, it is an object of the present invention to provide a tie down structure that can be mounted into a surface such that the tie down structure is readily usable when such is desired or required while also providing the ability to conceal the tie down structure when it is not in use, and to do so in an aesthetically-pleasing way.

SUMMARY OF THE INVENTION

The hidden tie down of the present invention has obtained these objects. It provides for a round collar that is insertable into a like-sized round aperture that is formed in a generally planar surface. One or more preferred embodiments of the cap and cap mount are attachable to the collar at the outer face of the surface. A nut or other fastener secures the collar to the surface at the inner face of the surface. Two opposing bushings are disposed within the collar to retain each end of a hook loop within them. The hook loop includes a round lid that closes off a like-sized round opening in the cap such that, in one position, the lid closes off the cap opening and creates a substantially flush surface across the cap. In another position, the hook loop extends outwardly from the cap opening to provide the attachment functionality alluded to above. Each bushing includes a detent that retains the hook loop and lid in one or the other of the two intended positions.

The foregoing and other features of the hidden tie down of the present invention will be apparent from the detailed description that follows.

DETAILED DESCRIPTION

Figure 1:
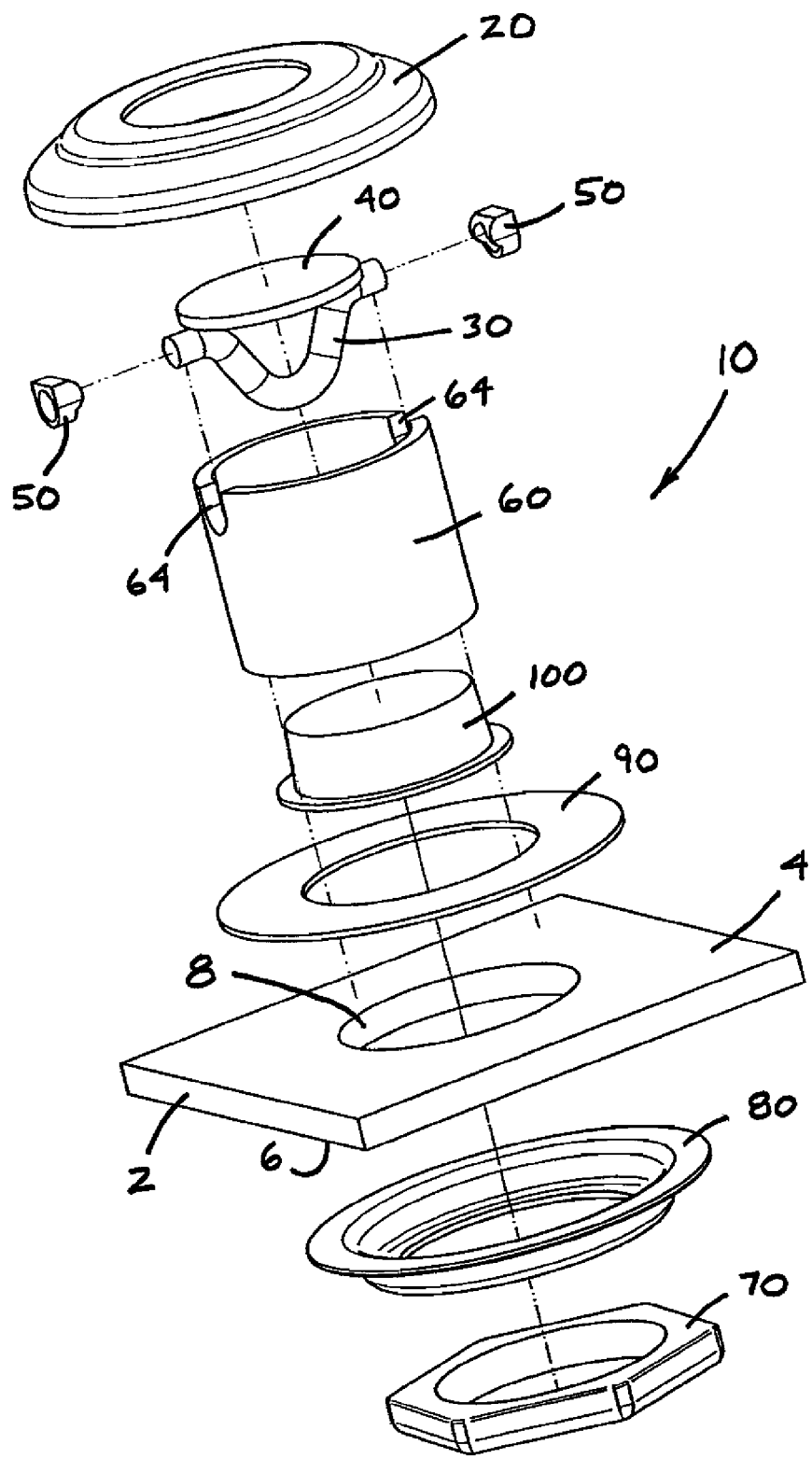
FIG. 1 is a front, top and left side perspective view of a first preferred embodiment of a hidden tie down that is constructed in accordance with the present invention and showing the hidden tie down in an exploded pre-assembly format.
Figure 2:
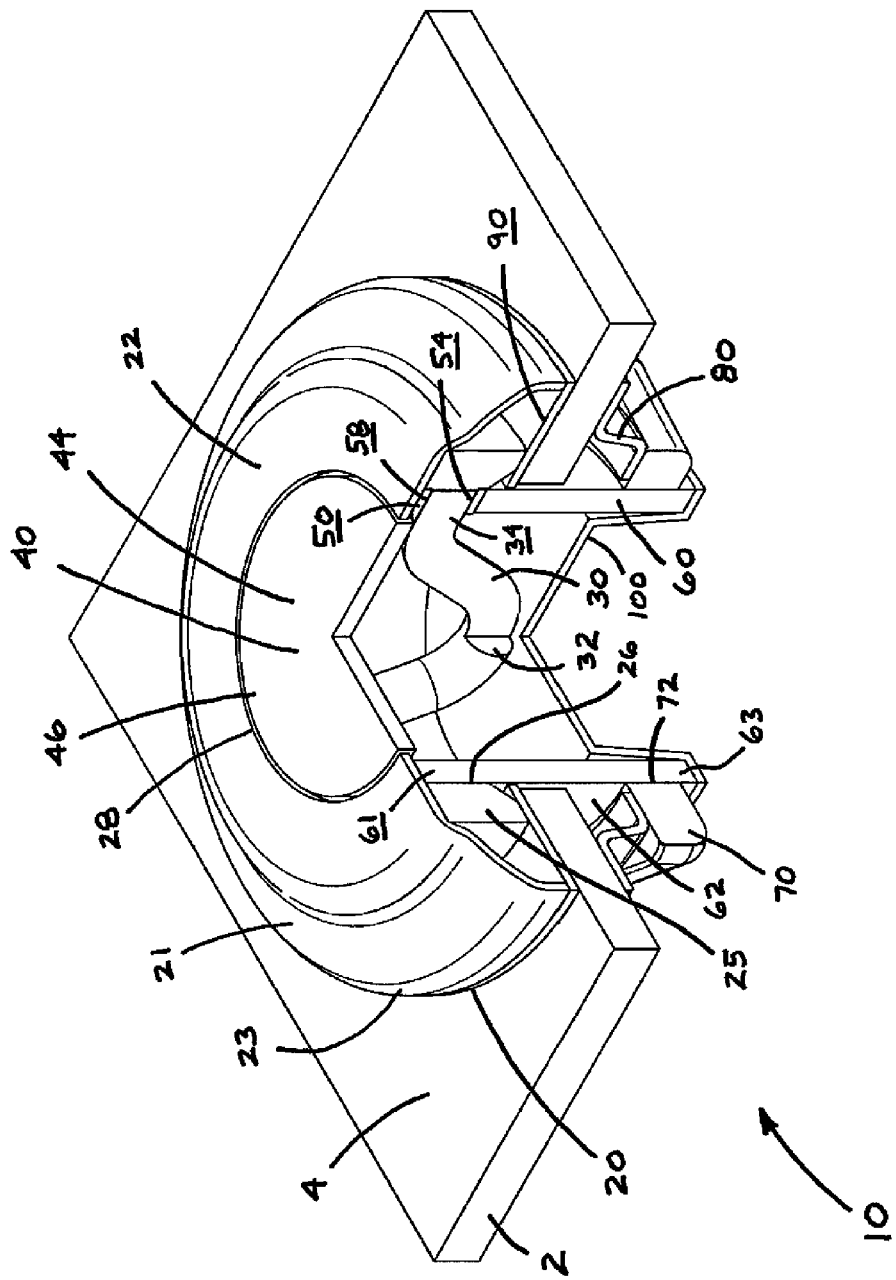
FIG. 2 is an enlarged and partially-sectioned front, top and left side perspective view of the hidden tie down of FIG. 1 and showing it as it would be installed within a surface with the loop in a stowed position.
Figure 3:
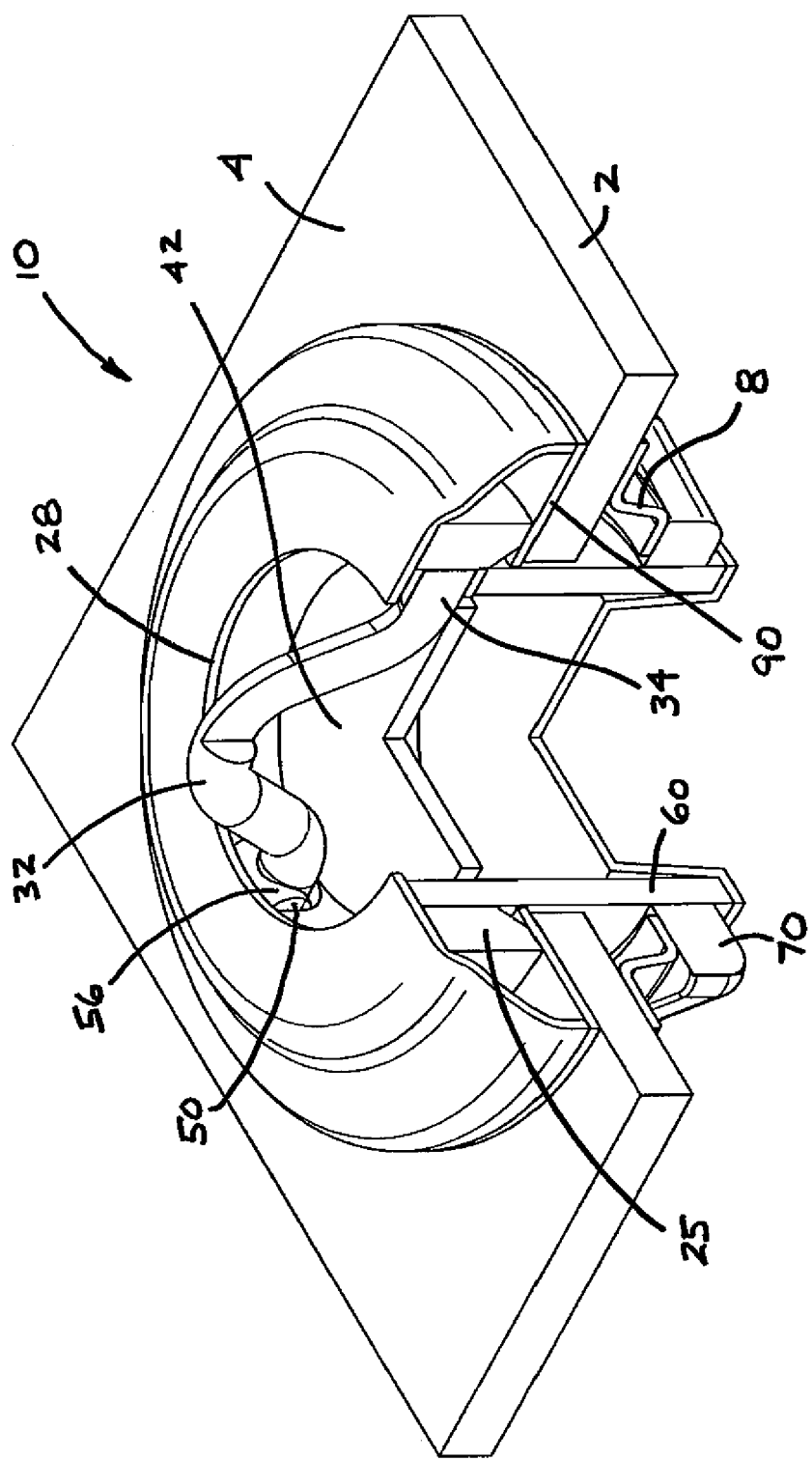
FIG. 3 is another enlarged and partially-sectioned front, bottom and left side perspective view of the installed hidden tie down of FIG. 1 and showing the loop as deployed and ready for use.
Figure 4:
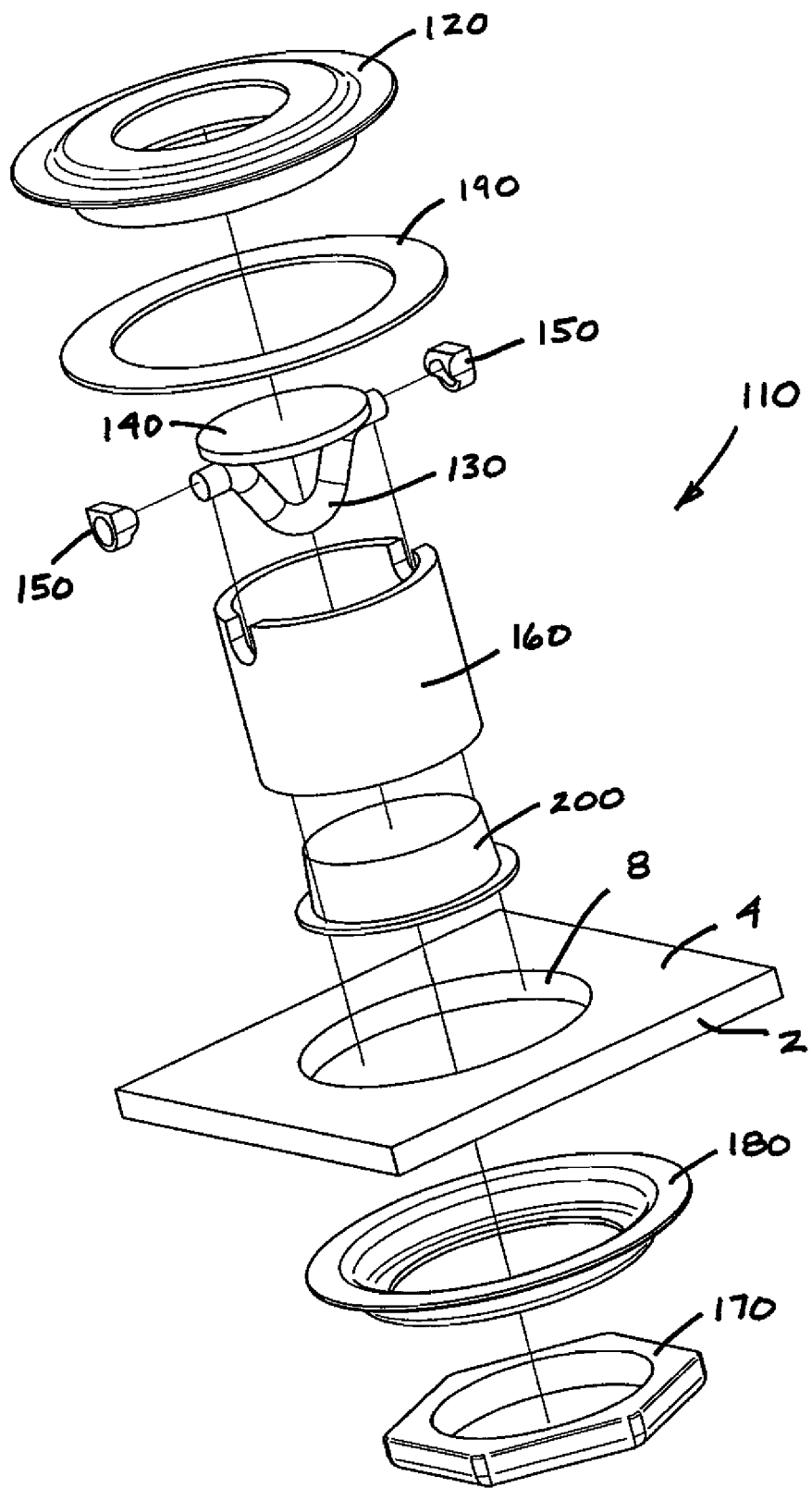
FIG. 4 is a front, top and left side perspective view of a second preferred embodiment of a hidden tie down that is constructed in accordance with the present invention and showing the hidden tie down in an exploded pre-assembly format.
Figure 5:
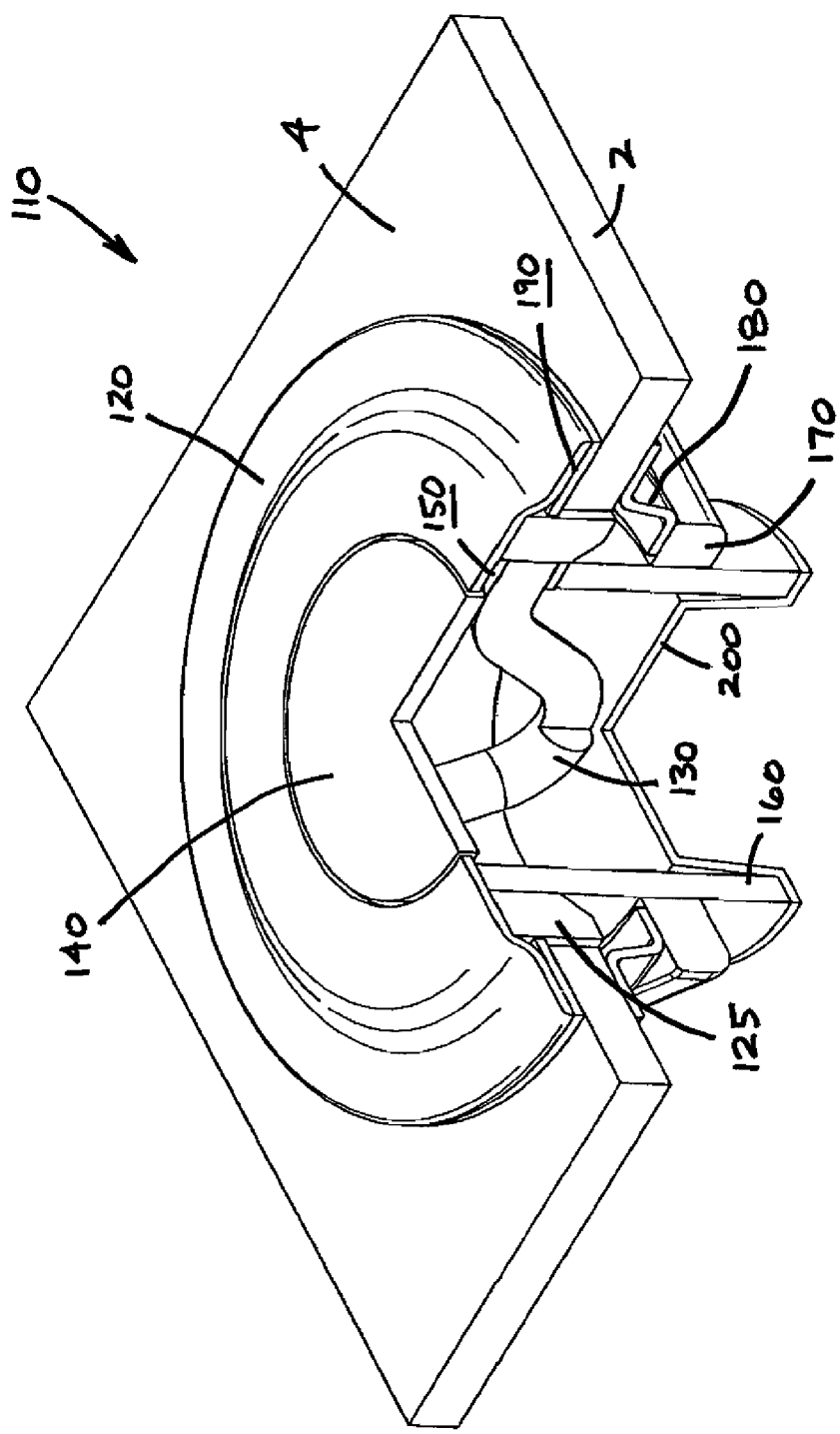
FIG. 5 is an enlarged and partially-sectioned front, top and left side perspective view of the hidden tie down of FIG. 4 and showing it as it would be installed within a surface with the loop in a stowed position.
Figure 6:
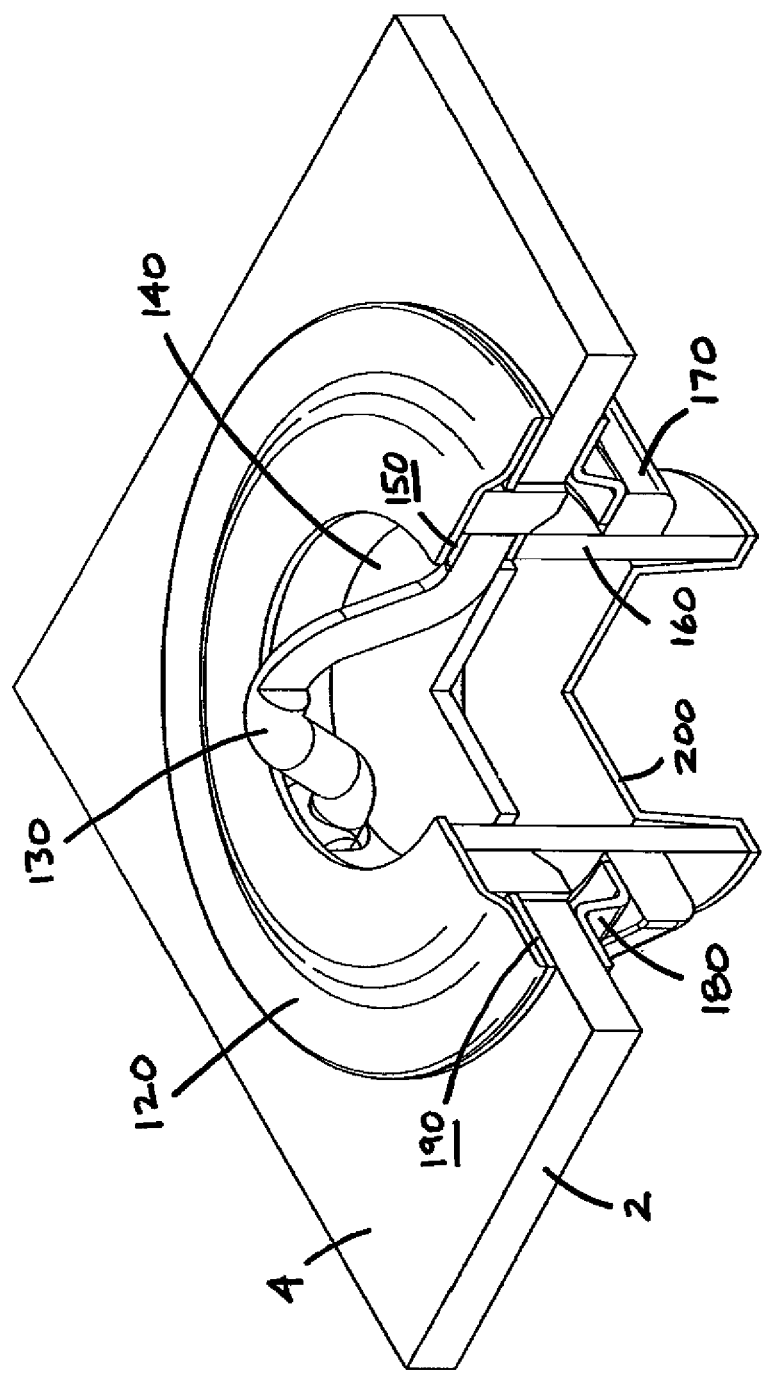
FIG. 6 is another enlarged and partially-sectioned front, bottom and left side perspective view of the installed hidden tie down of FIG. 4 and showing the loop as deployed and ready for use.
Figure 7:
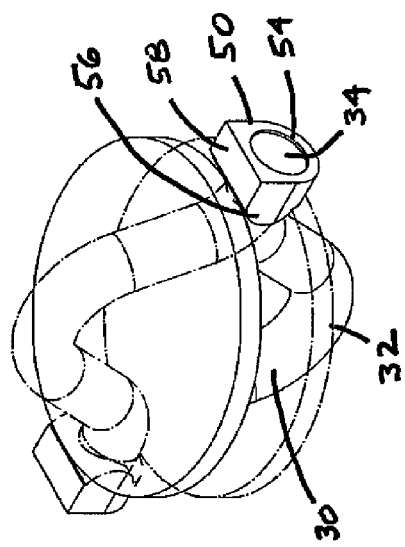
FIG. 7 is a front, top and right side perspective view illustrating only the hook loop, lid and bushings used in the hidden tie down embodiments shown in FIGS. 1 through 6.
Figure 8:
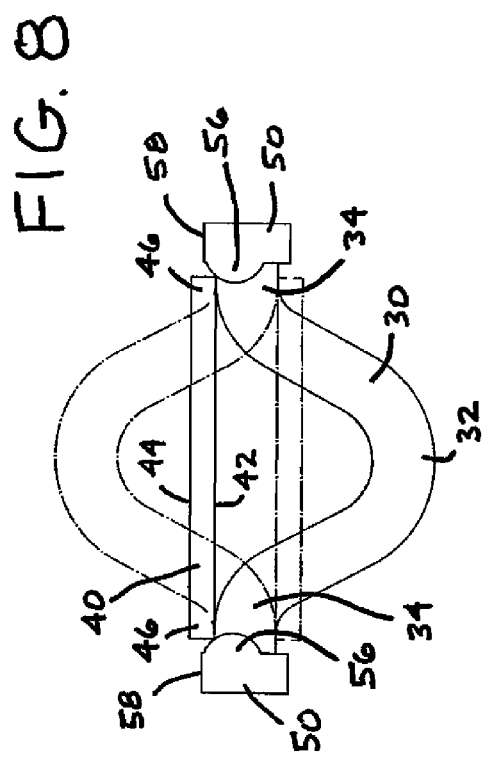
FIG. 8 is a left side elevational view of the elements illustrated in FIG. 7.

Referring now to the drawings in detail, wherein like numbered elements refer to like elements throughout, FIGS. 1 through 3 illustrate a representative structure, generally identified 10, which is a first preferred embodiment of a hidden tie down that is fabricated in accordance with the present invention. FIGS. 4 through 6 illustrate another representative structure, generally identified 110, which is a second preferred embodiment of the hidden tie down. FIGS. 7 and 8 are common to both embodiments.

Now referring specifically to FIG. 1, it illustrates an exploded view of the hidden tie down 10 of the present invention. The hidden tie down 10 generally comprises a number of separate elements including a cap 20, a hook loop 30, a lid 40, a pair of bushings 50, a collar 60 and a fastening nut 70. These are, more or less, the significant elements of the structure 10. In the preferred embodiment, a washer 80, a gasket 90 and a plug 100 are also provided. The latter elements are not required for functionality of the structure 10, but are included in the preferred embodiment. That is, other embodiments within the scope of the present invention could include a cushioning structure or other gasket-like structure for protection of the surface 2 and/or to seal the installation for one reason or another. All such embodiments are contemplated herein.

Referring to FIG. 2, which is a partially sectioned and enlarged view of the tie down 10 of the present invention, and which also shows the tie down 10 as it would be installed into a panel or surface 2. As shown in FIG. 1, the surface 2 has an outer face 4, an inner face 6 and a circular aperture 8 that extends between the faces 4, 6.

Continuing with FIG. 2, it will be seen that the cap 20 is a substantially round structure that includes an outer "domed" surface 21 and has an inner edge 22 and an outer edge 23. The inner edge 22 forms a circular aperture 28 within the cap 20. The cap 20 further includes an underside surface 24 to which is attached a cap mount 25, the cap mount 25 being a generally circular structure having a threaded inner surface 26. As disclosed in this application, the cap 20 is presented as a two-piece structure. It is, however, within the scope of the present invention to create a cap 20 wherein the cap 20 and the cap mount 25 are integrally-formed as a single piece of material. Such is not a limitation of the present invention.

The cap 20 is attached to the upper portion 61 of a threaded collar 60, the collar 60 comprising a substantially cylindrical structure having an outer surface 62, wherein the outer surface 62 of the collar 60 is threaded. The threads of the collar 60 are configured to mate with like threads that are formed on the inner surface 26 of the cap mount 25. It is to be noted that the outer edge 23 of the cap 20 rests on the outer face 4 of the planar structure 2 to which the tie down 10 is mounted. The cap 20 is then held in place by a nut 70 that similarly contains a like-threaded inner surface 72 that allows the nut 70 to be secured to the lower portion 63 of the collar 60. Having some amount of clearance between the cap mount 25 and the outer face 4 of the planar structure 2 allows for some flexing of the cap 20 at its inner edge 22, which can facilitate in the tightening of the nut 70 during securement of the tie down 10 to the surface 2. Disposed between the inner face 6 of the surface 2 and the nut 70 is a flat, washer-like circular gasket 90 and a washer 80, each of which is slipped over the lower portion 63 of the collar 60 prior to fastening the nut 70. It is also to be understood that other fasteners and other fastening means is contemplated in the tie down 10 of the present invention. That is, other non-threaded fasteners may be used to retain the tie-down 10 in its desired or required position.

Referring again to FIG. 1, it will be seen that the upper portion 61 of the collar 60 also includes a pair of opposing U-shaped sidewall openings 64. It will also be seen that each bushing 50 comprises a similarly-sized U-shaped structure having a U-shaped outer surface 52. It is to be understood that the U-shaped elements are presented so that proper positioning of the bushings 50 within the sidewall openings 64 is accomplished. This allows a bushing 50 to be snugly seated within each similarly-shaped collar opening 64. However, other functionally-cooperative shapes could be used and are intended to be within the scope of the present invention.

Referring to FIGS. 7 and 8, it will be seen that each bushing 50 further comprises a flat top surface 58, which surface 58 is intended to be disposed flush against the underside 24 of the inner edge 22 of the cap 20. Further, each bushing 50 comprises a round, and horizontally-disposed, aperture 54 that is formed into it, together with an inwardly-extending detent 56. As best shown in FIGS. 7 and 8, the detent 56 is an inwardly-extending arcuate member extending from the top surface 58 of the bushing 50 and ending at a point near the center of the aperture 54. In this way, the aperture 54 and the detent 56 overlap one another somewhat. Although the functionality of the detent 56 will be discussed later in this detailed description, it is to be understood that the function of the detent 56 could be accomplished by using other structures including, but not limited to, leaf springs, finger appendages and the like. It is significant that the detent 56 interferes with the lid 40 in the present invention, as will be apparent.

The aperture 54 of each bushing is adapted to receive one end 34 of the hook loop 30, each end 34 of the hook loop 30 extending slightly beyond the outer edge 46 of the disk-shaped lid 40. The hook loop 30 is a rod-like structure having a generally round cross-section. The hook loop 30 is bent into a substantially stretched-out, U-shaped configuration, which is best shown in FIG. 1. The hook loop 30 comprises an arcuate center portion 32. The center portion 32 is that portion of the hook loop 30 that is used to secure a strap, cord or other fastening line through the loop 30 such that the user can use the tie down 10, typically in combination with a plurality of such tie downs 10, to secure personal or other items to a surface 2. At a point near each end 34 of the hook loop 30, a portion of the outer edge 46 of the inner surface 42 of the disk-shaped lid 40 is attached to the hook loop 30 to form a combined lid 40 and hook loop 30 structure. It is also contemplated that the loop 30 and lid 40 could be configured as a single structure which is within the scope of this invention. In either construction or configuration, the combined lid 40 and hook loop 30 structure is able to be rotated as a unit about the two bushings 50. Rotation of the hook 30 and the lid 40 combination is permitted only when the outer edge 46 of the lid 40 overcomes resistance created by the detent 56, the detent 56 extending slightly inwardly of an imaginary cylinder formed by the circular aperture 28 of the cap 20. See FIGS. 3, 7 and 8. The lid 40 has a diameter that is slightly smaller than the diameter of the aperture 28 of the cap 20 such that the lid 40 "clears" the aperture 28 as it rotates. This minimal clearance, however, is intended to prevent debris from entering the cap 20 and lid 40 during use. The lid 40 further comprises an outer surface 44 which is intended to be aesthetically-pleasing when the hook loop 30 is stowed. Lastly, the tie down 10 can include a plug 100 to prevent debris from entering the tie down 10 from below the surface 2.

In application, and once the tie down 10 is properly installed, the center portion 32 of the hook loop 30 is intended to be stowed such that it faces inwardly, as shown in FIG. 2, when the hidden tie down 10 is not in use. This forms a substantially flush surface of the tie down 10 with the surrounding structure that the tie down 10 is secured within. Further, the detents 56 are provided to keep the lid 40 "flush" when the loop 30 is stowed.

When the hidden tie down 10 is in use, it will be seen that the center portion 32 of the hook loop 30 faces outwardly, as shown in FIG. 3, and the outer surface 44 of the lid 40 faces inwardly of the collar 60. As as shown in FIG. 5, it will be appreciated that the clearance between the center portion 32 of the hook loop 30 is minimal so as to allow the maximum size of loop 30 to be used within the hidden tie down 10. The same is true of the disk-like circular lid 40 which has a clearance such that, when the hook loop 30 is disposed with the tie down 10 as is shown in FIG. 3, the outer surface 44 of the lid 40, together with the cap 20, appear as almost a solid structure which accomplishes the aesthetic intention sought by use of the tie down 10 of the present invention.

It is to be noted that most of the elements of the hidden tie down 10 of the present invention can be made of metal, engineered plastic metal substitute or other substantially rigid materials, with the exception of the bushings 50 which, of necessity, require some resilient "give" and plastic or nylon "memory" so as to allow for the passage of the cap edges 46 over the bushing detent 56, one disposed to each side of the tie down 10. That is, the detent 56 must be capable of some amount of deformation to allow the edge 46 to pass over it when such is desired or required. After passing over the deformation, however, the detent 56 must return to its original shape to prevent further unintended rotation of the hook loop 30 and disk-like lid 40 during use. As previously alluded to, the detent 56 could be configured as a metallic spring or other similarly-functioning structure. It is also within the scope of the present invention to have the outer dome portion 21 of the cap 20 match the outer surface 44 of the lid 40 such that the lid 40 and cap 20 appear as a single solid structure for aesthetics, as alluded to above. Such surfaces could be finished by anodizing, chrome plating, painting, overlay or such other surface finishing or covering method, all of which are considered to be within the scope of the present invention.

Referring to FIGS. 4, 5 and 6, they show a second preferred and alternative embodiment of the hidden tie down, generally identified 110, that is constructed in accordance with the present invention. The tie down 110 generally comprises the same elements as that of its counterpart. Specifically, those include a cap 120, a hook loop 130, a lid 140, a pair of bushings 150, a collar 160 and a fastening nut 170. These are, more or less, the significant elements of the structure 110. In this preferred embodiment, a washer 180, a gasket 190 and a plug 200 are also provided. In all other respects, the functionality and scope of this second preferred embodiment is the same as that of the first embodiment. Noteworthy, however, is the fact that the cap 120 has an outer surface that is "flattened" and assumes the shape of a more "flush" structure, which is further intended to enhance aesthetics of the device.

The details of the invention having been disclosed in accordance with the foregoing, I claim:

1. A hidden tie down for use with a surface, the surface comprising an outer face, an inner face and a circular aperture that extends between the faces, the tie down comprising:
   a cap;
   a collar;
   means for fastening the cap and collar to the outer face of the surface;
   a pair of bushings;
   a lid; and
   a hook loop.

2. The hidden tie down of claim 1 wherein the cap comprises a substantially round structure comprising an outer domed surface.

3. The hidden tie down of claim 1 wherein the cap comprises a substantially round structure that is flattened.

4. The hidden tie down of claim 1 wherein the cap and collar are configured as a unitary structure.

5. The hidden tie down of claim 1 wherein the lid and hook loop structure comprise opposing ends, the collar comprises a pair of openings and each bushing is configured to fit within a collar opening, and the bushings comprise apertures for receiving the ends of the lid and hook loop.

6. The hidden tie down of claim 4 wherein the lid and hook loop structure comprises a detent facing inwardly of the collar.

7. The hidden tie down of claim 5 wherein the lid and hook loop form a unitary structure.

8. The hidden tie down of claim 1 wherein a cap mount comprises a threaded inner surface and wherein the collar comprises a threaded outer surface, the threads of the collar being configured to mate with the threads of the cap mount.

9. The hidden tie down of claim 8 wherein the fastening means comprises a fastening nut having a threaded inner surface, the threads of the nut being configured to mate with the threads of the collar.

10. The hidden tie down of claim 1 wherein the collar further comprises an upper portion and a pair of opposing sidewall openings and wherein each bushing of the pair of bushings comprises a structure substantially in the shape of the openings and an aperture.

11. The hidden tie down of claim 10 wherein each bushing further comprises a detent facing inwardly of the collar.

12. The hidden tie down of claim 11 wherein the lid comprises a disk-shaped structure having an outer edge and an inner surface.

13. The hidden tie down of claim 12 wherein the hook loop comprises a stretched-out U-shaped structure having opposing ends, each opposing end being receivable within the aperture of a bushing of said pair of bushings, and the hook loop being attached to the inner surface of the lid to form a unitary structure with the lid.

14. The hidden tie down of claim 13 wherein the detent of the bushing provides resistance to the outer edge of the lid when the lid and hook loop are rotated about the bushings to maintain the lid and hook loop in one of two alternative positions.

15. The hidden tie down of claim 10 wherein the collar sidewall openings are U-shaped and wherein the structure of each bushing of the pair of bushings comprises a similarly-sized U-shaped structure.

16. The hidden tie down of claim 15 wherein each bushing is made of a resilient material.

* * * * *